United States Patent [19]
Tilley et al.

[11] Patent Number: 5,836,657
[45] Date of Patent: Nov. 17, 1998

[54] DETACHABLE STABILIZED INTERMODAL CONTAINER DUMPING APPARATUS

[75] Inventors: Jeffrey L. Tilley, Omaha, Nebr.; Ross F. Meyer, Mesa, Ariz.

[73] Assignee: Omaha Standard, Inc., Council Bluffs, Iowa

[21] Appl. No.: 641,700

[22] Filed: May 1, 1996

[51] Int. Cl.⁶ .................................. B60P 1/16; B60P 1/64
[52] U.S. Cl. ...................... 298/1 A; 298/22 R; 298/22 P; 410/82
[58] Field of Search .................................. 410/77, 80, 82; 414/498, 469; 298/22 P, 1 A, 17 T, 22 R; 280/DIG. 8

[56] References Cited

U.S. PATENT DOCUMENTS

| | | |
|---|---|---|
| 1,506,136 | 8/1924 | Remde . |
| 1,786,884 | 12/1930 | Allan . |
| 2,369,838 | 2/1945 | Minnis . |
| 2,835,502 | 5/1958 | Willetts ................................ 280/43.22 |
| 2,894,785 | 7/1959 | Yackel ................................... 298/22 P |
| 3,833,261 | 9/1974 | Dingler .................................. 298/1 A |
| 4,111,321 | 9/1978 | Webster .............................. 414/498 X |
| 4,126,357 | 11/1978 | Day ......................................... 298/1 A |
| 4,597,710 | 7/1986 | Kovats . |
| 4,618,306 | 10/1986 | Dorsch . |
| 4,826,386 | 5/1989 | Corompt ............................. 414/498 X |
| 4,875,811 | 10/1989 | Merrett et al. . |
| 5,078,560 | 1/1992 | Patrick et al. . |
| 5,088,795 | 2/1992 | Chen et al. ........................... 410/82 X |
| 5,238,357 | 8/1993 | Patrick et al. . |
| 5,256,023 | 10/1993 | Patrick et al. . |
| 5,362,198 | 11/1994 | Patrick .................................. 414/786 |

FOREIGN PATENT DOCUMENTS

2334641  1/1974  Germany ................................ 410/82

*Primary Examiner*—Stephen Gordon
*Attorney, Agent, or Firm*—Adam H. Jacobs

[57] ABSTRACT

A detachable stabilized intermodal container dumping apparatus for removable mounting on an intermodal container transport vehicle includes a container support frame having forward and rearward ends, a lower frame section and an upper frame section. The upper frame section is constructed of at least two upper section long sill members and at least two upper section crossbeam members mounted on the upper section long sill members. The lower frame section is constructed of at least two lower section long sill members and at least two lower section crossbeam members mounted on the lower section long sill members. The upper frame section is hingedly connected to the lower frame section adjacent the rearward end of the container support frame along a hinge pivot axis extending generally perpendicular to the longitudinal axis of the container support frame such that the upper frame section may pivot relative to the lower frame section, thus permitting dumping of an intermodal container situated thereon. The lower frame section includes at least two lower frame connection devices mounted thereon for removably mounting the container support frame on an intermodal container transport vehicle. The upper frame section includes at least two upper frame connection devices mounted thereon which are designed to accept and secure an intermodal container. Finally, a hoist unit is mounted on the lower frame section forward of the hinge pivot axis, the hoist unit is further connected to the upper frame section forward of the hinge pivot axis such that upon engagement of the lifting device, the upper frame section is pivoted about the hinge pivot axis relative to the lower frame section, thus dumping an intermodal container mounted thereon.

9 Claims, 7 Drawing Sheets

DETACHABLE STABILIZED INTERMODAL CONTAINER DUMPING APPARATUS

BACKGROUND OF THE INVENTION

1. Technical Field

This invention relates to stabilized intermodal container dumping devices and, more particularly, to a detachable stabilized intermodal container dumping apparatus for detachable mounting on an intermodal container transport vehicle, the apparatus including a container support frame having a lower frame section and an upper frame section, the upper frame section hingedly connected to the lower frame section adjacent the rearward end of the frame, a hinge unit for pivoting the upper frame section relative to the lower frame section, and connection devices on the upper and lower frame sections for connection to the container and vehicle.

2. Description of the Prior Art

Intermodal transportation at its most basic level involves interconnections among modes of transportation, use of multiple transport modes for a single trip and coordinated transportation policy and decision-making. Before the advent of intermodal transportation, the transport industry has traditionally focused on individual transportation modes; automobiles, trains, trucks, ships and airplanes. In an intermodal system, the above elements are combined in a seamless system that efficiently meets the needs of travelers and shippers. The most common form of intermodal transport involves container shipping, which involves the use of "intermodal containers" for storing and transporting the shipped goods. Intermodal containers are found in a number of shapes and sizes, and are used for transport of an almost limitless variety of goods, from flowables such as oil, milk and granular products to automobiles and dry goods.

It is common that the tractor-trailers designed for carrying the intermodal containers be of a standard dimension to accommodate the widest variety of intermodal containers possible. These trailers are usually fitted with at least four connectors for accepting and mounting the container thereon. Common connectors include the ISO Twistlock connector, which consists of plate on which is mounted a generally rectangular box-shaped pedestal. A thick pin extends upwards through the pedestal and is rotatably mounted therein for rotation about a vertical axis. Affixed to the top of the pin is a pyramid-shaped cap which is positioned above the pedestal, and affixed to the base of the pin is a handle for rotating the pin and cap combination. When a container is placed on the trailer, the cap extend upwards and is received by a rectangular socket formed on the underside of the container. The socket is designed such that the cap and pedestal extend into the socket and the container thus rests on the plate, and further that the socket can receive the cap and pedestal only when the cap and pedestal are aligned. To lock the container on the trailer, the handle is turned, thus rotating the pin and cap within the pedestal, thus unaligning the cap and pedestal which prevents the cap from disengaging from the socket. The same sequence is performed for each of the connectors until the container is secured on the trailer. The trailer/container is then ready for transport.

Once the trailer/container reaches its destination, it must be unloaded. It is clear that the different types of goods are unloaded from the intermodal containers in different manners, but regarding the unloading of flowable goods, it is most common to place the intermodal container on a trailer that has been specially equipped with a hoist and hoist frame on the trailer frame. Following placement of the container on the specially outfitted trailer, the container may then be dumped by extension of the hoist in the ordinary manner.

The major disadvantage of the system used at present is that for dumping of multiple containers, each container must be loaded on a hoist-equipped trailer in turn and dumped, thus slowing the off-loading of goods from the truck, train, ship or plane. The only alternative to this system has been to provide additional hoist-equipped trailers, thus causing additional expense to the intermodal transport operator. Furthermore, as the hoist-equipped trailers are designed solely for use with flowable containers, the trailers will spend a great deal of time being unused, thus causing further financial drain to the operator. There is therefore a need for a hoist system which can be used in a variety of situations and can be removed from a trailer when it is no longer needed.

Furthermore, any such hoist apparatus should be designed to fit between the container and trailer on which it is removably mounted. At present, the prior art does not disclose a hoist unit and frame which may be removably mounted on a standard intermodal container trailer, but instead discloses fixed mount hoists of a kind presently known in the art (see Patrick et al., U.S. Pat. Nos. 5,078,560, 5,238,357, 5,256,023 and 5,362,198). However, without such an apparatus, the disadvantages discussed above are not remedied. There is therefore a need for a dumping apparatus which can be easily and quickly transferred between trailer units.

Of course, such a dumping apparatus should include some type of independent hydraulic system for operation independently of any tractor unit. While not absolutely necessary, such a system would allow for even grater flexibility in use of the hoist apparatus. It should be noted that no such system is disclosed in the prior art of intermodal transportation.

Finally, another problem encountered in the prior art is that the hoist units used are often non-stabilized, single piston units, as shown in Merrett et al., U.S. Pat. No. 4,875,811. Such hoists, when used in unloading flowables from containers, are much more prone to failure than a stabilized hoist of the same lift rating, due to shifting of the contents of the container. There is therefore a need for a intermodal container hoist apparatus which includes a stabilized hoist unit.

Therefore, an object of the present invention is to provide a detachable stabilized intermodal container dumping apparatus for use in intermodal transportation systems.

Another object of the present invention is to provide a detachable stabilized intermodal container dumping apparatus which can be quickly and efficiently detachably mounted on a standard intermodal container trailer for providing dump capabilities for the trailer.

Another object of the present invention is to provide a detachable stabilized intermodal container dumping apparatus which includes a stabilized hoist unit for greater stability during the dumping of flowable goods from the container.

Another object of the present invention is to provide a detachable stabilized intermodal container dumping apparatus including a separate hydraulic system for providing hydraulic fluid to the cylinders of the hoist unit independently of the hydraulic system of the trailer or tractor/truck.

Another object of the present invention is to provide a detachable stabilized intermodal container dumping apparatus including a hoist frame having upper and lower frame sections hingedly connected to one another with the hoist unit connected to the two frame sections such that upon extension of the hoist, the upper frame section is pivoted upwards from the lower frame section.

Another object of the present invention is to provide a detachable stabilized intermodal container dumping apparatus in which the upper frame section includes a plurality of connection devices such as ISO Twistlock connectors for connection to an intermodal container, and the lower frame section includes a plurality of connection sockets such as ISO Twistlock sockets for connection to a standard intermodal container trailer.

Finally, an object of the present invention is to provide a detachable stabilized intermodal container dumping apparatus which is durable and simple in construction and safe and efficient in use.

SUMMARY OF THE INVENTION

The present invention provides a detachable stabilized intermodal container dumping apparatus for removable mounting on an intermodal container transport vehicle which includes a container support frame including longitudinal and transverse frame axes, forward and rearward ends, a lower frame section and an upper frame section. The upper frame section is preferably constructed of at least two upper section long sill members and at least two upper section crossbeam members mounted on the upper section long sill members. Similarly, the lower frame section is constructed of at least two lower section long sill members and at least two lower section crossbeam members mounted on the lower section long sill members. The rigid container support frame of the present invention is thus formed. The upper frame section is hingedly connected to the lower frame section adjacent the rearward ends of the upper frame section and the lower frame section along a hinge pivot axis extending generally perpendicular to the longitudinal axis of the container support frame such that the upper frame section may pivot relative to the lower frame section, thus permitting dumping of an intermodal container situated thereon. The lower frame section further includes at least two lower frame connection devices mounted thereon for removably mounting the container support frame on an intermodal container transport vehicle. Likewise, the upper frame section includes at least two upper frame connection devices mounted thereon which are designed to accept and secure an intermodal container. Finally, the detachable stabilized intermodal container dumping apparatus includes a hoist unit mounted on the lower frame section forward of the hinge pivot axis, the hoist unit including a stabilizing frame and at least one lifting device which is a hydraulic cylinder, the hoist unit further connected to the upper frame section forward of the hinge pivot axis such that upon engagement of the lifting device, the upper frame section is pivoted about the hinge pivot axis relative to the lower frame section, thus dumping an intermodal container mounted thereon.

The numerous advantages of the present invention over those devices found in the prior art include that the detachable stabilized intermodal container dumping apparatus can be quickly and easily mounted on a wide variety of trailers, so long as the trailer is equipped for attachment of an intermodal container. Furthermore, because the dumping apparatus is designed to fit between the intermodal container and the trailer by using the ISO Twistlock (or equivalent) fasteners already in use industry-wide, there is no need to modify either the trailer or the intermodal container to accept the dumping apparatus. Also, the stabilized hoist unit will prevent destabilization of the container/trailer combination upon being raised, as shifting of the load within the container will not cause failure of the hoist unit. Finally, when fitted with an independent hydraulic system, the detachable stabilized intermodal container dumping apparatus may be used on any trailer regardless of the type of towing vehicle being used. It is thus seen that the detachable stabilized intermodal container dumping apparatus of the present invention is superior to those devices found in the prior art.

DESCRIPTION OF THE PREFERRED EMBODIMENT

Figure 1:
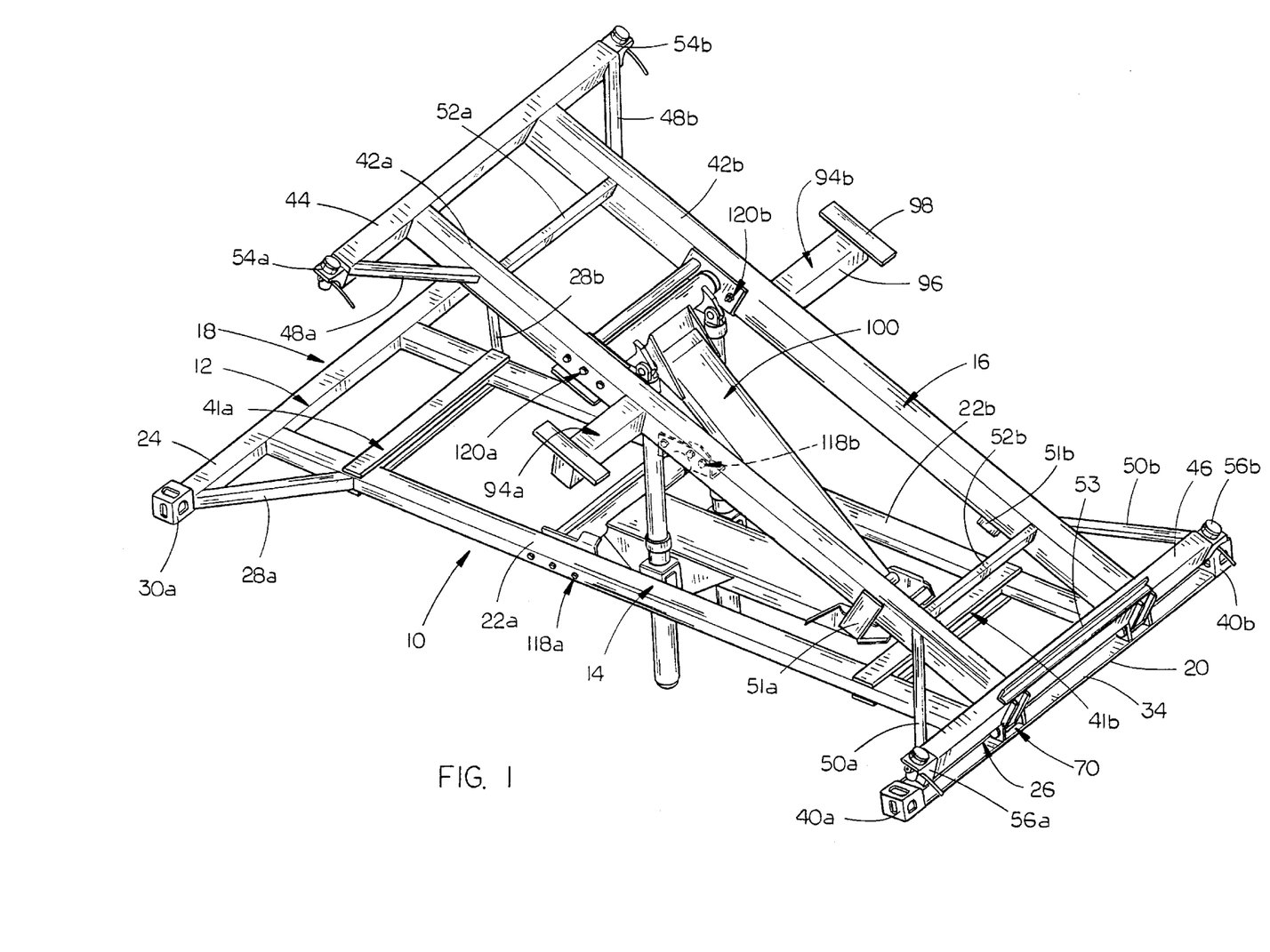
FIG. 1 is a perspective view of the detachable stabilized intermodal container dumping apparatus of the present invention.

The detachable stabilized intermodal container dumping apparatus 10 of the present invention is shown in FIGS. 1–6 as including a container support frame 12 and a hoist unit 100. The container support frame 12 includes a lower frame section 14 and an upper frame section 16, with the upper frame section 16 being hingedly connected to the lower frame section 14 as shown in FIG. 1. Lower frame section 14 includes a forward end 18 and a rearward end 20, shown for clarification purposes. Lower frame section 14 further includes two lower section long sill members 22a and 22b which extend the length of lower frame section 14 and form the basis for the lower frame section structure. Each lower section long sill member 22a and 22b is preferably formed of steel tubing, and in the preferred embodiment, each lower section long sill member 22a and 22b has a width dimension of 6", a height dimension of 2", a wall thickness of ³⁄₁₆" and a length of 224½" or 18' 8½". Of course, it is to be understood that these dimensions are representative of the preferred embodiment shown in FIGS. 1–6, and are not critical to the functionality of the present invention. The previous statement applies to all subsequent dimensions set forth in this document, unless otherwise noted.

Figure 2:
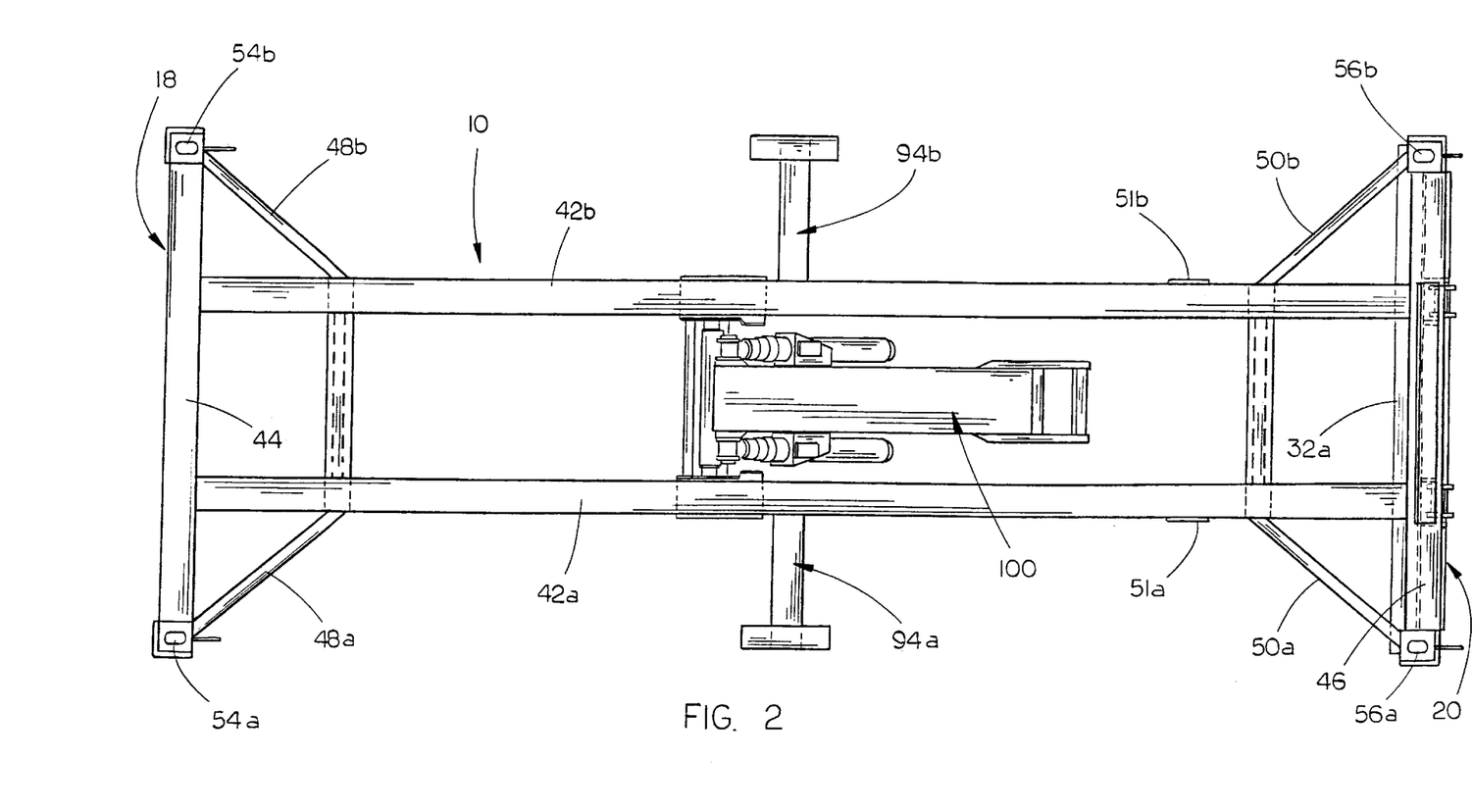
FIG. 2 is a top plan view of the embodiment of FIG. 1.
Figure 3:
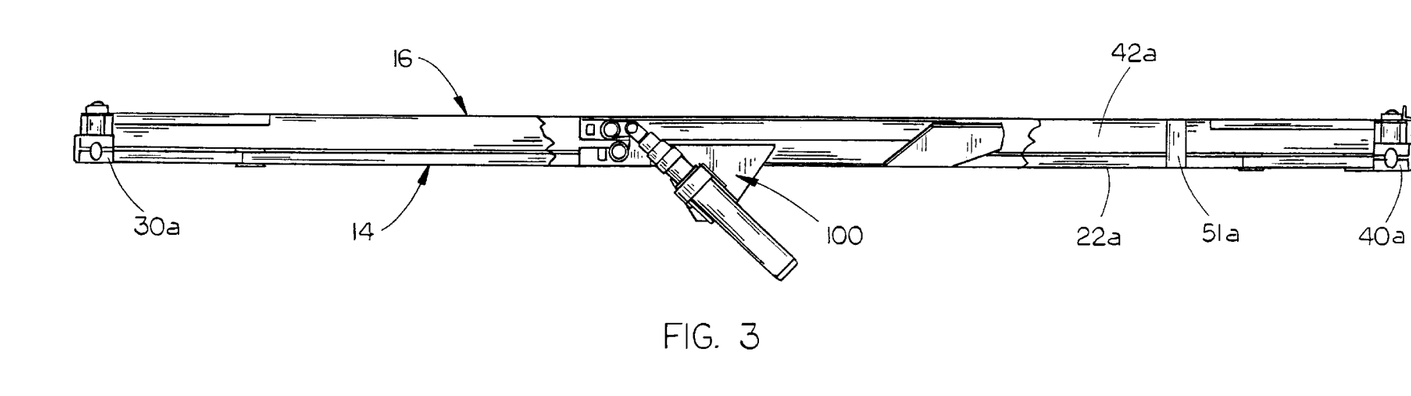
FIG. 3 is a side elevational view of the embodiment of FIG. 1.

Lower section long sill members 22a and 22b preferably extend substantially parallel with one another, as shown best in FIG. 2. Also, note that the members 22a and 22b are positioned such that the width dimension is the greatest (i.e. 6"). Additional lateral rigidity is supplied, in addition to lessening the overall height of the detachable stabilized intermodal container dumping apparatus 10. The lower section long sill members 22a and 22b are secured in spaced apart relation by two lower section crossbeam members 24 and 26, one member 24 affixed to the long sill members 22a and 22b at the forward end 18 of the container support frame 12 and the other member 26 affixed to the long sill members 22a and 22b at the rearward end 20 of the container support frame 12, as shown in FIG. 1. The crossbeam members are formed differently as the rearward crossbeam member 26 must accommodate the hinge mechanism 70 which connects upper frame section 16 to lower frame section 14. It is preferred that long sill members 22a and 22b be secured approximately 30" apart, although this dimension can be modified depending on the required spacing determined by the trailer dimensions.

Forward lower crossbeam member 24 is preferably constructed of similar steel tubing as was described in connection with lower frame long sill members 22a and 22b, is welded to the forward ends of the long sill members 22a and 22b and preferably would have a length perpendicular to the long sill members of approximately 83³⁄₁₆" or 6' 11³⁄₁₆", although this length is only important in order to permit the connection of the detachable stabilized intermodal container dumping apparatus 10 to a trailer fitted for intermodal containers. The forward lower crossbeam member 24 would thus have a transverse width parallel with long sill members 22a and 22b of 6" and a vertical height of 2". The forward lower crossbeam member 24 may be further braced by the addition of diagonal braces 28a and 28b, as shown in FIG. 1, which extend between and connect the outer ends of forward lower crossbeam member 24 and each of the long sill members 22a and 22b at points spaced rearwards from the forward end 18 of container support frame 12. Diagonal braces 28a and 28b may be secured to forward lower crossbeam member 24 and each of the lower long sill members 22a and 22b in any appropriate manner, although welding is preferred, and may be constructed of C-channel, steel tubing or angle steel.

Mounted at opposite outer ends of forward lower crossbeam member 24 are front frame mount connectors 30a and 30b, which in the preferred embodiment are steel boxes approximately 3" to 6" in width and height each designed to accept and secure one cap and pedestal combination mounted on a trailer, thus releasably securing the detachable stabilized intermodal container dumping apparatus 10 on a trailer. An example of a preferred type of front frame mount connector 30a and 30b is the container corner fitting manufactured by Blair Transport Technology of Illinois, which is a steel corner casting to ISO dimensions and ratings. The frame mount connectors 30a and 30b will be discussed in greater detail below in connection with the mounting of the apparatus on a trailer.

Figure 5:
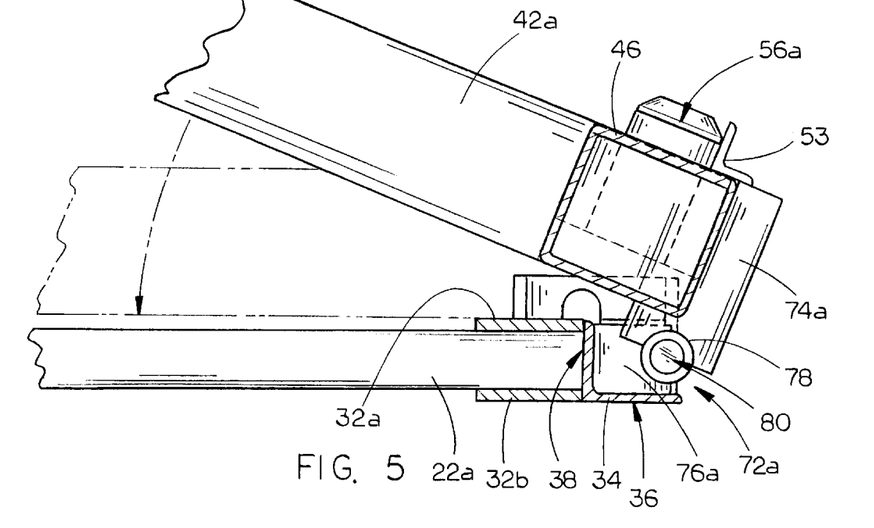
FIG. 5 is a partial detail side elevational view of the hinge mechanism of the detachable stabilized intermodal container dumping apparatus of FIG. 1.

Moving to the rearward end 20 of container support frame 12, there is shown the rearward lower crossbeam member 26, which in the preferred embodiment actually consists of the following described structure. FIG. 5 shows a cross-sectional view of the rearward lower crossbeam member 26 which includes two steel crossbeam plates 32a and 32b, each being a length of steel plate approximately 6" in width, ⅜" in thickness and 83³⁄₁₆" in length. The steel crossbeam plates 32a and 32b are mounted above and below the lower long sill members 22a and 22b thus "sandwiching" the ends of the lower long sill members 22a and 22b and securing them in spaced apart relation. Also, steel crossbeam plates 32a and 32b extend generally perpendicular to the lower long sill members 22a and 22b. Mounted on the rearward sides of steel crossbeam plates 32a and 32b to long sill members 22a and 22b is rearward hinge angle 34, which is constructed of angle steel approximately 4" in width, 3" in height, 83³⁄₁₆" in length and ¼" in thickness. The upright flange 38 of rearward hinge angle 34 is mounted to the rearward ends of long sill members 22a and 22b such that the base flange 36 of rearward hinge angle 34 is aligned generally coplanar with the bottom face of steel crossbeam plate 32b. Hinge mechanism 70 is mounted within the angle formed by base flange 36 and upright flange 38 of rearward hinge angle 34, and will be discussed in detail later in this disclosure.

Mounted on the outer ends of steel crossbeam plates 32a and 32b are a pair of rear frame mount connectors 40a and 40b, which are generally identical to the front frame mount connectors 30a and 30b. It is preferred that rear frame mount connectors 40a and 40b be mounted primarily on steel crossbeam plates 32a and 32b and not to rearward hinge angle 34 for improved structural strength, although it is not critical that the connectors be mounted so.

Finally, the lower frame section 14 includes in the preferred embodiment a pair of cross braces 41a and 41b, as shown in FIG. 1. Cross braces 41a and 41b are preferably constructed of steel plates mounted above and below the lower long sill members 22a and 22b similar to that manner described in connection with steel crossbeam plates 32a and 32b. The steel plates of each of the cross braces 41a and 41b are preferably 4" in width, ⅜" in thickness and extend outwards to the outer edges of lower long sill members 22a and 22b, thus each having a length of approximately 42". Rear diagonal braces (not shown) extending between steel crossbeam plates 32a and 32b and long sill members 22a and 22b, similar to front diagonal braces 28a and 28b, may also be included to further stabilize the frame.

Turning to upper frame section 16, we find that, generally, it includes the same or similar features as described in connection with lower frame section 14, with some modifications. Upper frame section 16 includes upper long sill members 42a and 42b, upper forward crossbeam member 44, upper rearward crossbeam member 46, front and rear diagonal braces 48a, 48b, 50a and 50b and frame cross braces 52a and 52b, all arranged as was discussed previously in connection with lower frame section 14. However, in the upper frame section 16, upper long sill members 42a and 42b are preferably constructed of 6"×6" steel tubing for additional vertical strength and stability, which is necessary because when the sill members 42a and 42b support and lift a container, the weight of the cargo and container must be entirely supported by the long sill members 42a and 42b. Also, the upper long sill members 42a and 42b have a length of approximately 220" or 18' 4", to abut the rearward upper crossbeam member as discussed below.

The forward upper crossbeam member 44 is preferably constructed of 6"×6" steel tubing as described in connection with upper long sill members 42a and 42b and extends generally parallel with forward lower crossbeam member 24. Also, forward upper crossbeam member 44 would have a transverse length of approximately 83³⁄₁₆", thus having the same length as the forward lower crossbeam member 24.

The rearward upper crossbeam member 46 is preferably constructed of the same steel tubing as forward upper crossbeam member 44 and is mounted on and extends generally perpendicular to upper long sill members 42a and 42b. Rearward upper crossbeam member 46 is mounted to the rearward ends of upper long sill members 42a and 42b. It is preferred that rearward upper crossbeam member 46 have the same dimensions as forward upper crossbeam member 44, including overall length.

Figure 4:
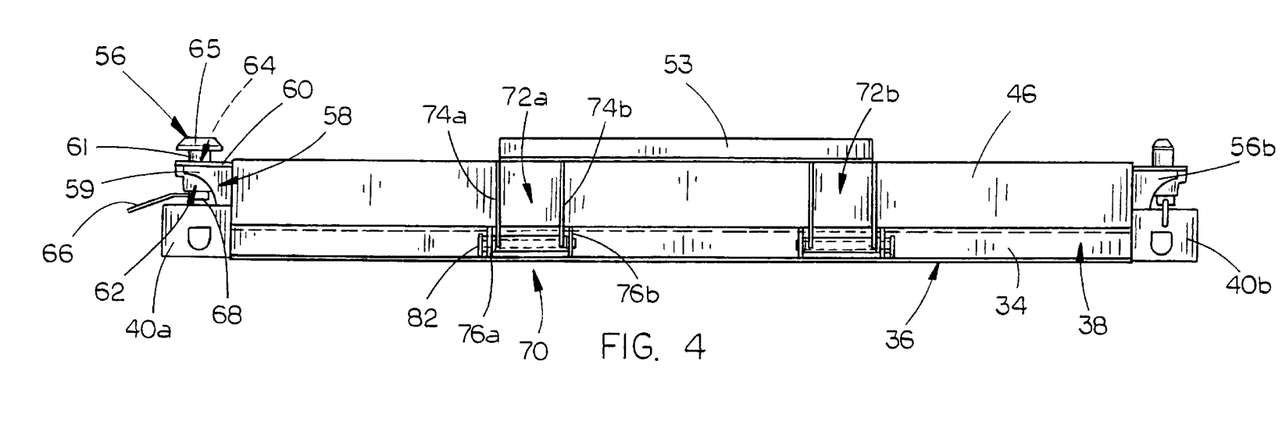
FIG. 4 is an end elevational view of the embodiment of FIG. 1 showing the connectors on the frame.

Mounted on the outer ends of the forward and rearward crossbeam members 44 and 46 are four container connectors 54a and 54b, and 56a and 56b respectively. Each of the container connectors 54a, 54b, 56a and 56b are identical, therefore the following description of container connector 56a should be understood to apply to all four container connectors 54a, 54b, 56a and 56b. Container connector 56a is preferably a standard ISO connector such as the Twistlock manufactured by Blair Transport Technology of Illinois. The container connector 56a, shown best in FIG. 4, preferably consists of a mounting body 58 having a support block 59 and a top plate 60, as shown in FIG. 4. The support block 59 is mounted to the respective crossbeam member 44 and 46 thus positioning the container connector 56a in the correct container-receiving position. Mounted on top plate 60 is a generally rectangular box-shaped pedestal 61 approximately 4" in length, 2" in width and 1" to 1½" in height. The top plate 60 is approximately 6"×6" and the support block is approximately 3" to 6" in height. A vertical shaft 62 extends through the support block 59, top plate 60 and rectangular box-shaped pedestal 61. A stem 64 is rotatably supported within the vertical shaft 62, the stem 64 having a length at least ½" greater than the length of the shaft 62. The stem 64 thus extends upwards through the pedestal 61 and is rotatably mounted within the shaft 62 for rotation about a vertical axis. Fixedly mounted to the top of the stem 64 is a pyramid-shaped cap 65 which is positioned above the pedestal 61, and affixed to the base of the stem 64 below the support block 59 is a handle 66, secured to the stem 64 by a collar 68 or the like, for rotating the stem 64 and cap 65. It is preferred that the base of the cap 65 have width and length dimensions similar to the pedestal dimensions, and further that the cap have a height dimension of approximately 1". When a container is placed on the trailer, the cap 65 and pedestal 61 extend upwards and are received by a container corner fitting mounted on the underside of the container. The corner fitting is preferably a standard ISO container corner fitting generally similar to the forward and rearward frame mount connectors 30a, 30b, 40a and 40b mounted on the lower frame section 14, and all of these would preferably consist of a 6"×6"×4" hollow cast steel box including a socket on each side of the box extending through the wall of the box. The bottom face socket is generally rectangular and is designed such that the cap 65 and pedestal 61 may extend into the socket and the container thus may rest on the plate 60, and further that the socket can receive the cap 65 and pedestal 61 only when the base of the cap 65 and top of the pedestal 61 are aligned. To lock the container on the trailer, the handle 66 is turned, thus rotating the stem 64 within the pedestal 61 and rotating the cap 65 within the corner fitting, thus unaligning the cap 65 and pedestal 65 which prevents the cap 65 from disengaging from the socket due to contact between the cap 65 and socket.

Regarding the positioning of the container connectors 54a, 54b, 56a and 56b on the upper frame section and the forward and rearward frame mount connectors 30a, 30b, 40a and 40b on the lower frame section, all of the various connectors must be aligned. More specifically, when the container support frame 12 is closed with upper and lower frame sections 14 and 16 in contact with one another, it is vital that each one of container connectors 54a, 54b, 56a and 56b be aligned directly above a respective one of the forward and rearward frame mount connectors 30a, 30b, 40a and 40b such that the container support frame 12 may be positioned between a trailer and a container. To ensure that the upper and lower frame sections 16 and 14 are aligned when the container support frame 12 is closed, guide plates 51a and 51b may be mounted on the upper frame section 16, one plate 51a and 51b on each upper long sill member 42a and 42b, as shown in FIGS. 1 and 2. Each plate 51a and 51b is mounted on the sill member 42a and 42b such that the lower end of the plate 51a and 51b extends approximately 2" below the base of the sill member 42a and 42b and thus engages the lower long sill member 22a and 22b below when the container support frame 12 is in closed position. It is preferred that each plate 51a and 51b be approximately 8" in height, 6" in width and ⅜" in thickness. Plates 51a and 51b thus align the lower and upper frame sections 14 and 16 when the container support frame 12 is in closed position.

Mounted atop the rearward upper crossbeam member 46 is a container stop bar 53 which in the preferred embodiment is constructed of a piece of angle steel approximately 35" in length and 2" in height, as shown in FIG. 1. Container stop bar 53 extends above rearward upper crossbeam member 46 to prevent rearward movement of a container beyond a certain position. It is preferred that container stop bar 53 be positioned generally adjacent the rearward end 20 of container support frame 12 such that when a container is on upper frame section 16 and in contact with the container stop bar 53, the container will be longitudinally aligned with the container connectors 54a, 54b, 56a and 56b. Also, the sockets on the container tend to be slightly larger than the pedestals on the container connectors, and thus the container will shift slightly when secured on the container support frame. The container stop bar 53 assists in preventing that movement.

Upper frame section 16 is hingedly connected to lower frame section 14 by a hinge mechanism 70, shown best in FIG. 5. The hinge mechanism 70 preferably includes a pair of hinges 72a and 72b, one hinge 72a and 72b mounted adjacent each upper long sill member 42a and 42b. In the preferred embodiment, each hinge 72a and 72b is substantially identical, therefore the following description of hinge 72a should be understood to apply to hinge 72b as well.

Hinge 72a includes a pair of upper hinge brackets 74a and 74b which are generally L-shaped sections of steel plate. Each upper hinge bracket 74a and 74b includes an upright leg and a sleeve-engaging leg, the upright leg mounted on the rear face of the rearward upper crossbeam member 46 and the sleeve-engaging leg under lapping and engaging the bottom face of the rearward upper crossbeam member 46. Each upper hinge bracket 74a and 74b should be positioned generally upright, as shown in FIG. 4. It is preferred that each upper hinge bracket 74a and 74b be constructed of ⅜" steel plate, although the material used is not critical to the invention so long as sufficient structural strength is maintained.

Mounted in the rear hinge angle 34 on lower frame section 16 are a pair of lower hinge brackets 76a and 76b each of which are generally rectangular in shape and are mounted to the base flange 36 and upright flange 38 of rear hinge angle 34. It is preferred that upper hinge brackets 74a and 74b be generally parallel with lower hinge brackets 76a and 76b, as shown in FIG. 4. Also it is preferred that lower hinge brackets 76a and 76b be constructed of ⅜" steel plate, although the material used is not critical to the invention so long as sufficient structural strength is maintained.

As shown in FIG. 5, upper hinge brackets 74a and 74b and lower hinge brackets 76a and 76b each further include semi-circular cutout sections for connection to the hinge sleeve 78. Hinge sleeve 78 is preferably constructed similar to a standard hinge sleeve, and thus includes a cylinder mounted thereon, including at least one hinge pin receiving upper center cylinder and two hinge pin receiving lower outer cylinders. The center cylinder fits within the semi-circular cutout sections of upper hinge brackets 74a and 74b and is mounted thereon, while the two outer cylinders are mounted on the lower hinge brackets 76a and 76b in the semi-circular cutout sections therein. Upon alignment of the center and outer cylinders, a hinge pin 80 is inserted through the centers of all the cylinders, thus pivotally securing the cylinders together and providing hinged connection of the lower and upper frame sections 14 and 16 along a hinge pivot axis defined by the center longitudinal axis of the cylindrical hinge pin 80. To secure the hinge pin in the cylinders, a hinge pin stop 82 may also be provided.

Of course, the above description of the hinge mechanism 70 should not be read to limit the different types of hinges which may be employed. For example, heavy duty applications may require extensive restructuring of the hinge to provide sufficient strength for the hinge. The hinge may also include multiple cylinders, as in a door hinge or the like. The most important consideration, however, should always be to provide a hinge mechanism which is durable in use and safe in construction.

Figure 6:
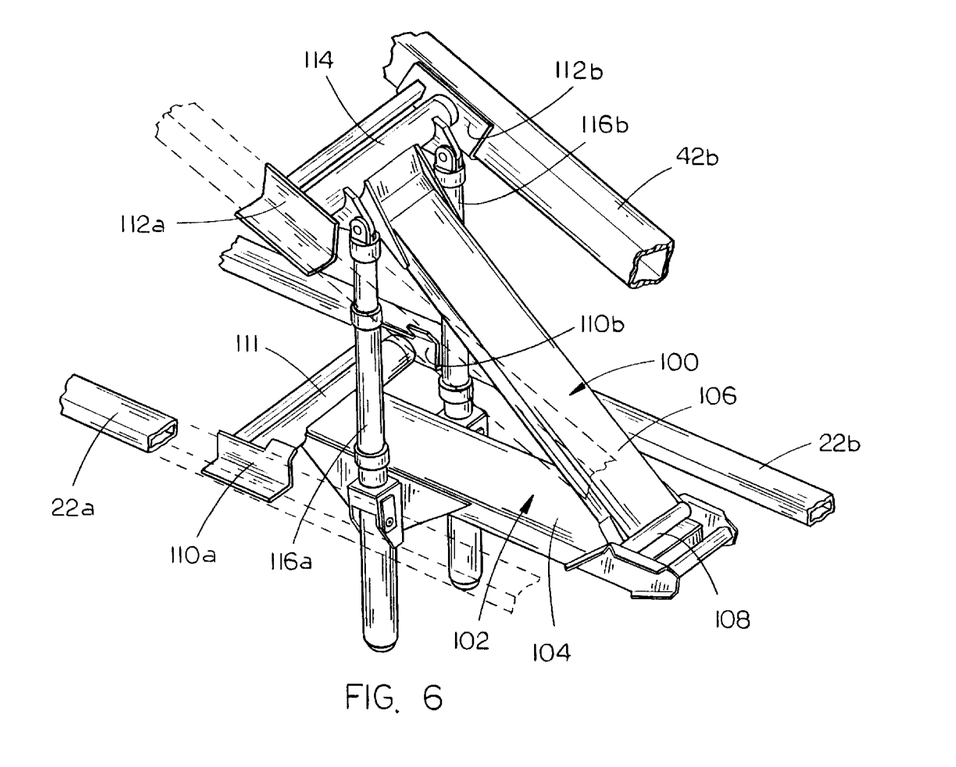
FIG. 6 is a partial detail perspective view of the hoist unit and connection of the hoist unit to the frame of the dumping apparatus.

The upper frame section is lifted by a hoist unit 100 such as Olympic 144 HD Hoist manufactured by Omaha Standard, Inc. of Iowa. Such a hoist unit commonly includes a hinged stabilizing frame 102 having a lower arm 104, an upper arm 106 and a central hinge 108 connecting lower arm 104 and upper arm 106. Lower arm 104 is pivotally mounted to lower frame section 14 as shown in FIG. 6, by mounting a pair of angle steel connection braces 110a and 110b to the pivot connection 111 on lower arm 104, then attaching by connection bolts 118a and 118b one angle steel connection brace 110a and 110b to a respective one of the lower section long sill members 22a and 22b. Likewise, upper arm 106 is pivotally mounted to upper frame section 16 as shown in FIG. 6 by mounting a pair of angle steel connection braces 112a and 112b to the pivot connection 114 on upper arm 106, then mounting those angle steel connection braces 112a and 112b to the upper long sill members 42a and 42b by connection bolts 120a and 120b. It is preferred that the angle steel connection braces 110a, 110b, 112a and 112b be mounted on the upper and lower frame sections 14 and 16 approximately 141" or 11' 9" forward of the rotational axis of the hinge mechanism 70. By connecting the hoist unit 100 to the frame 12 with bolts instead of by welding, replacement and repair of the hoist unit 100 is greatly facilitated, although the hoist unit 100 may be mounted in any appropriate manner.

Lifting force for the hoist unit 100 is provided by a pair of hydraulic cylinders 116a and 116b which are pivotally connected to the lower and upper arms 104 and 106 of the hoist unit. Upon engagement of the hydraulic cylinders 116a and 116b, the hoist unit 100 is extended and the upper frame section 16 is pivoted upwards from the lower frame section 14 about the hinge axis of the hinge mechanism 70. It is to be understood that the further detailed discussion of the operation of an hydraulic hoist is unnecessary, as one skilled in the art of hoist operation would be eminently familiar with such details. Also, numerous other types of hoist units may be used with the present invention, among them such types as the Long Stroke Twin Cylinder Scissors Hoist manufactured by Omaha Standard, Inc. of Iowa which is capable of lifting up to 29.1 tons.

Figure 7:
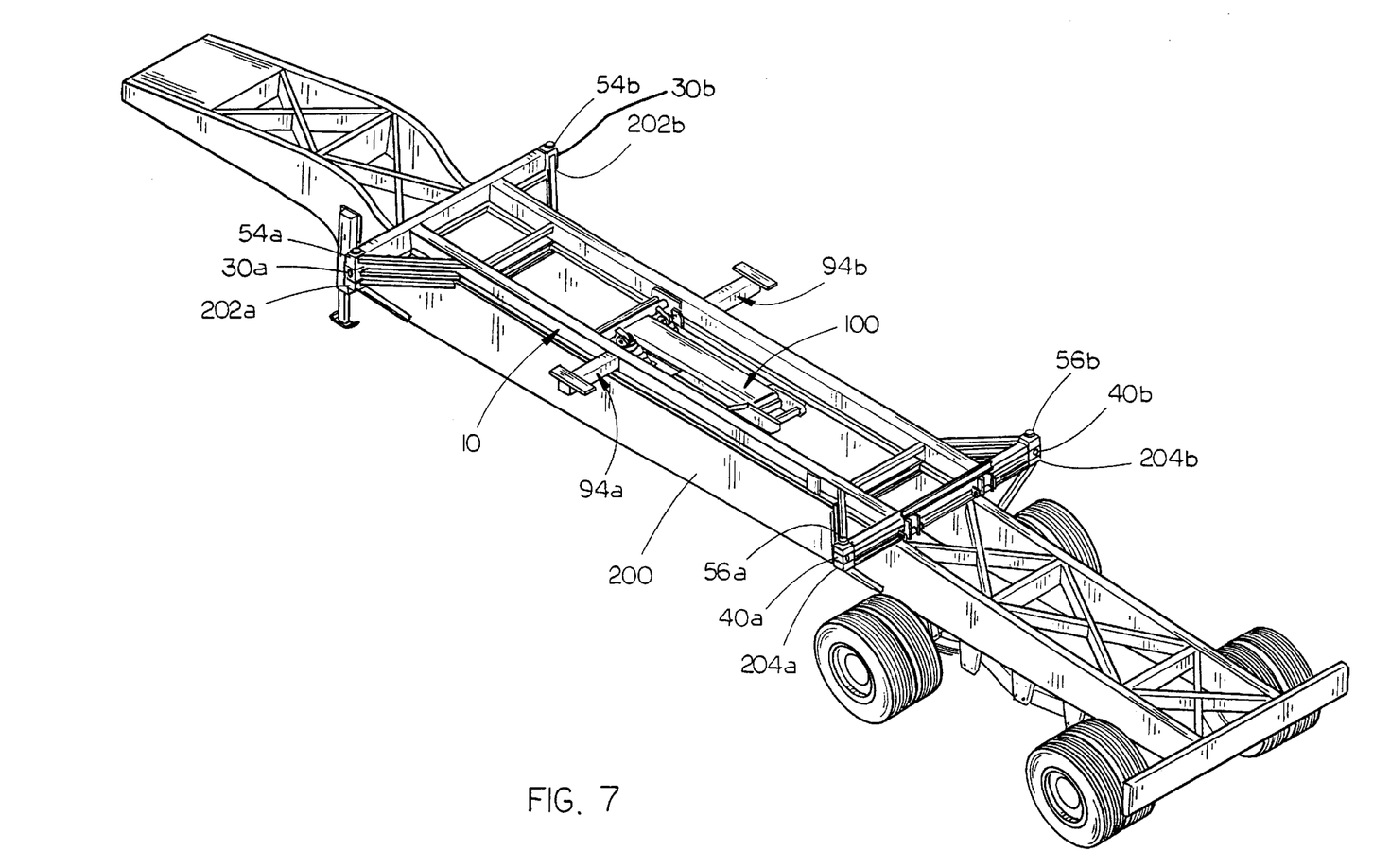
FIG. 7 is a perspective view of an intermodal-type trailer outfitted with the detachable stabilized intermodal container dumping apparatus of the present invention.
Figure 8:
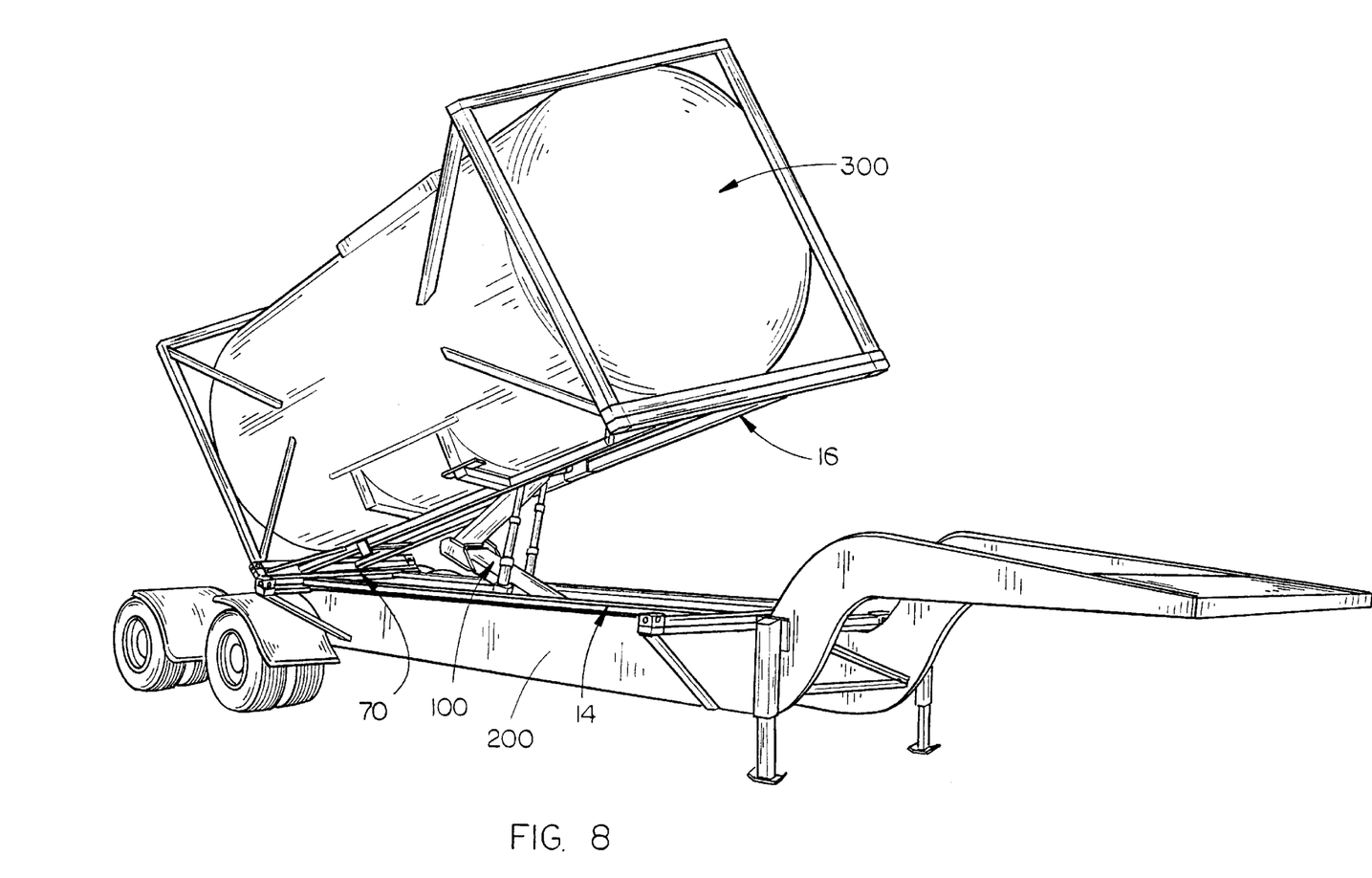
FIG. 8 is a perspective view of the intermodal-type trailer of FIG. 7 with the detachable stabilized intermodal container dumping apparatus of the present invention fitted thereon; the contents of an intermodal container on the apparatus are being dumped.

FIGS. 7 and 8 display the detachable stabilized intermodal container dumping apparatus 10 of the present invention being mounted on a typical intermodal trailer 200. The trailer 200 includes container connectors 202a, 202b, 204a and 204b mounted thereon which are substantially identical to container connectors 54a, 54b, 56a and 56b and are aligned to receive a container 300 placed thereon. Instead of placing a container 300 on the trailer 200, however, the detachable stabilized intermodal container dumping apparatus 10 of the present invention is secured on the container connectors 202a, 202b, 204a and 204b by aligning the frame mount connectors 30a, 30b, 40a and 40b with the container connectors 202a, 202b, 204a and 204b as the container support frame 12 is moved over and onto the trailer 200 by crane, forklift or the like. The container support frame 12 is then lowered onto the trailer, with the caps and pedestals of the container connectors 202a, 202b, 204a and 204b being inserted into the bottom sockets of the frame mount connectors 30a, 30b, 40a and 40b. The caps of the container connectors 202a, 202b, 204a and 204b may then be turned as previously described to secure container connectors 202a, 202b, 204a and 204b to frame mount connectors 30a, 30b, 40a and 40b thus securing the lower frame section 14 to the trailer 200.

The container 300 is then mounted on the upper frame section 16 by a crane or the like in the same manner as described in connection with the mounting of the frame 12 on the trailer 200, but involving container connectors 54a, 54b, 56a and 56b and the corner fittings on the container 300. It has been found that it is sometimes necessary to provide greater support for the container 300 than only the connection of the container 300 to the container connectors 54a, 54b, 56a and 56b. For this purpose, wing supports 94a and 94b may be added to the upper frame section 16 as shown in FIGS. 1, 2 and 7. Wing support 94b is identical to wing support 94a, and therefore the following description of wing support 94b should be understood to apply equally to wing support 94a. Wing support 94b includes a wing joist 96 which extends perpendicularly outwards from upper long sill member 42b and is constructed of 6"×6" steel tubing as used in upper long sill member 42b. Mounted atop wing joist 96 is engagement plate 98 adjacent the outer end of wing joist 96 which engages the underside of the container 300. The engagement plate 98 is preferably constructed of ⅜" steel plate, although it may be necessary to increase the thickness to contact the underside of the container 300. When a container 300 is placed on the upper frame section 16, the outer rails of the container 300 rest on the wing supports 94a and 94b, and thus the middle section of the container 300 is supported.

The container 300 is then ready for dumping. The hoist unit 100 is engaged and upper frame section 16 is pivoted upwards from lower frame section 14 about the hinge pivot axis of hinge mechanism 70. After dumping, the container 300 is lowered and the upper and lower frame sections 16 and 14 contact one another with guide plates 51a and 51b directing the engagement.

Figure 9:
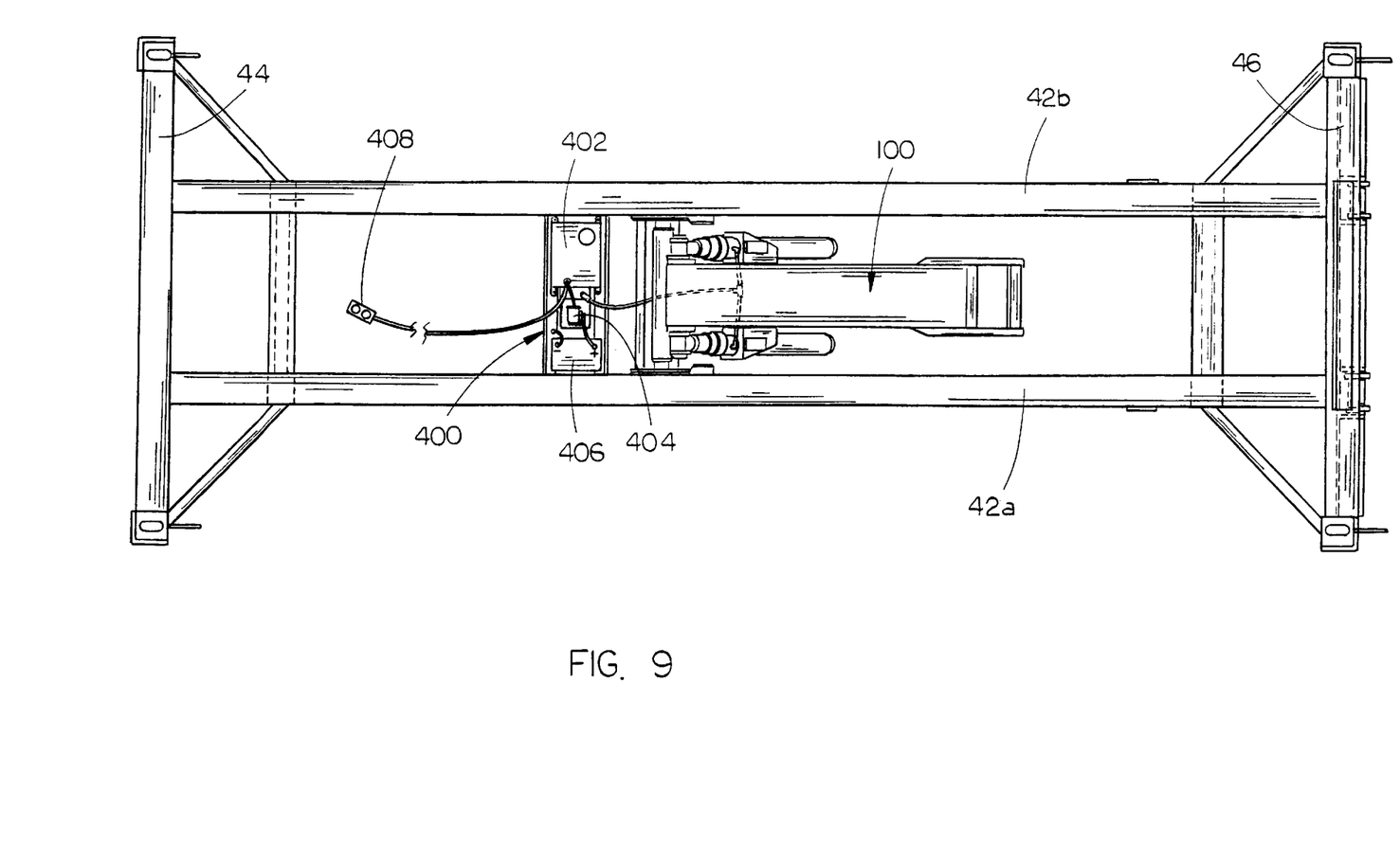
FIG. 9 is a top plan view of an alternative embodiment of the detachable stabilized intermodal container dumping apparatus of the present invention which includes an independent hydraulic fluid reservoir and pump.

FIG. 9 discloses an alternative embodiment of the detachable stabilized intermodal container dumping apparatus 10 of the present invention in which the container support frame 12 further includes an independent hydraulic fluid supply unit 400 for supplying fluid to the cylinders 116a and 116b for operation thereof. Briefly, the hydraulic fluid supply unit 400 would include an hydraulic fluid reservoir 402 in fluid connection with a fluid pump 404 which in turn is in fluid connection with the hydraulic cylinders 116a and 116b. The fluid pump is electrically connected to a battery 406 or other power source for operation thereof, and may also include an on/off control 408 for engaging and disengaging the fluid pump 404. Operation of the hoist unit 100 is performed in the same manner as previously described, with fluid being sent to the cylinders 116a and 116b by the fluid pump 404. Operation of the detachable stabilized intermodal container dumping apparatus 10 is thus completely independent of the tractor or trailer or any other vehicle involved in the transport of intermodal containers.

It is clear from the preceding discussion that the present invention provides numerous advantages over those devices found in the prior art. These include that the detachable stabilized intermodal container dumping apparatus can be quickly and easily mounted on a wide variety of trailers, so long as the trailer is equipped for attachment of an intermodal container. Furthermore, because the dumping apparatus is designed to fit between the intermodal container and the trailer by using the ISO Twistlock (or equivalent) fasteners already in use industry-wide, there is no need to modify either the trailer or the intermodal container to accept the dumping apparatus. Also, the stabilized hoist unit will prevent destabilization of the container/trailer combination upon being raised, as shifting of the load within the container will not cause failure of the hoist unit. Finally, when fitted with an independent hydraulic system, the detachable stabilized intermodal container dumping apparatus may be used on any trailer regardless of the type of towing vehicle being used. It is thus seen that the detachable stabilized intermodal container dumping apparatus of the present invention is superior to those devices found in the prior art.

It is to be understood that numerous modifications and substitutions may be made to the present invention which fall within the intended broad scope of the appended claims. For example, the hinge mechanism could be constructed to extend across the length of the rearward upper and lower crossbeam members. Also, the structural members of the container support frame 12 may be modified, removed or substituted so long as the structural integrity of the frame is preserved. Furthermore, many different types of hoist units may be used with the present invention.

There has thus been shown and described a detachable stabilized intermodal container dumping apparatus which accomplishes at least all of the stated objectives.

We claim:

1. A detachable stabilized intermodal container dumping apparatus for removable mounting on an intermodal container transport vehicle, said apparatus comprising;

a container support frame including longitudinal and transverse frame axes, forward and rearward ends, a lower frame section and an upper frame section, at least two upper frame container connection devices mounted on said upper frame section for removably mounting an intermodal container thereon;

said upper frame section including frame means operative to fixedly mount said upper frame container connection devices in spaced apart relation whereby said upper frame container connection devices are positioned to receive an intermodal container thereon;

at least two lower frame connection devices mounted on said lower frame section for removably and releasably mounting said container support frame on an intermodal container transport vehicle such that when said lower frame connection devices engage an intermodal container transport vehicle, said lower frame connection devices fixedly mount said lower frame section on the vehicle;

said lower frame section including frame means operative to fixedly mount said lower frame connection devices in spaced apart relation whereby said lower frame connection devices are positioned to fit onto an intermodal container transport vehicle;

said upper frame section hingedly connected to said lower frame section adjacent said rearward end of said container support frame along a hinge pivot axis extending generally perpendicular to said longitudinal axis of said container support frame whereby said upper frame section may pivot relative to said lower frame section; and a hoist unit mounted on said container support frame forward of said hinge pivot axis, said hoist unit including a non-lifting stabilizing frame and at least one lifting device, said lifting device being pivotally attached at both upper and lower ends thereof to said non-lifting stabilizing frame, said stabilizing frame of said hoist unit connected at a respective connection point to each of said lower and upper frame sections forward of said hinge pivot axis such that upon engagement of said lifting device, said upper frame section is pivoted about said hinge pivot axis relative to said lower frame section, said lower end pivotal attachment of said lifting device being spaced from the connection point of the stabilizing frame to the lower frame section in the direction of the longitudinal axis of the container support frame.

2. The detachable stabilized intermodal container dumping apparatus of claim 1 wherein said frame means of said upper frame section comprises at least two upper long sill members and at least two upper crossbeam members each having outer ends, said upper crossbeam members mounted on said upper long sill members, said upper long sill members extending generally parallel with said longitudinal axis of said container support frame and said upper crossbeam members extending generally perpendicular to said upper long sill members, one of said upper crossbeam members mounted on said upper long sill members adjacent said forward end of said container support frame and the other of said upper crossbeam members mounted on said upper long sill members adjacent said rearward end of said container support frame whereby said upper long sill members are secured in spaced apart relation.

3. The detachable stabilized intermodal container dumping apparatus of claim 2 comprising a total of four of said upper frame container connection devices, one of said upper frame container connection devices mounted adjacent each of said outer ends of said crossbeam members, said upper frame container connection devices thereby being arranged to accept and secure an intermodal container thereon.

4. The detachable stabilized intermodal container dumping apparatus of claim 1 wherein said frame means of said lower frame section comprises at least two lower long sill members and at least two lower crossbeam members each having outer ends, said lower crossbeam members mounted on said lower long sill members, said lower long sill members extending generally parallel with said longitudinal axis of said container support frame and said lower crossbeam members extending generally perpendicular to said lower long sill members, one of said lower crossbeam members mounted on said lower long sill members adjacent said forward end of said container support frame and the other of said lower crossbeam members mounted on said lower long sill members adjacent said rearward end of said container support frame whereby said lower long sill members are secured in spaced apart relation.

5. The detachable stabilized intermodal container dumping apparatus of claim 1 wherein said non-lifting stabilized frame of said hoist unit comprises a hinged stabilizing frame having a lower arm, an upper arm and a central hinge hingedly connecting said lower arm and said upper arm, and said lifting device comprises at least one hydraulic cylinder.

6. A detachable stabilized intermodal container dumping apparatus for removable mounting on an intermodal container transport vehicle, said apparatus comprising;
- a container support frame including longitudinal and transverse frame axes, forward and rearward ends, a lower frame section and an upper frame section,
- at least two upper frame container connection devices mounted on said upper frame section for removably mounting an intermodal container thereon;
- said upper frame section including frame means operative to fixedly mount said upper frame container connection devices in spaced apart relation whereby said upper frame container connection devices are positioned to receive an intermodal container thereon;
- at least two lower frame connection devices mounted on said lower frame section for removably mounting said container support frame on an intermodal container transport vehicle;
- said lower frame section including frame means operative to fixedly mount said lower frame connection devices in spaced apart relation whereby said lower frame connection devices are positioned to fit onto an intermodal container transport vehicle;
- said upper frame section hingedly connected to said lower frame section adjacent said rearward end of said container support frame along a hinge pivot axis extending generally perpendicular to said longitudinal axis of said container support frame whereby said upper frame section may pivot relative to said lower frame section;
- a hoist unit mounted on said container support frame forward of said hinge pivot axis, said hoist unit including a non-lifting stabilizing frame and at least one lifting device, said lifting device being pivotally attached at both upper and lower ends thereof to said non-lifting stabilizing frame, said stabilizing frame of said hoist unit connected to said lower and upper frame sections forward of said hinge pivot axis such that upon engagement of said lifting device, said upper frame section is pivoted about said hinge pivot axis relative to said lower frame section;
- said frame means of said lower frame section including at least two lower long sill members and at least two lower crossbeam members each having outer ends, said lower crossbeam members mounted on said lower long sill members, said lower long sill members extending generally parallel with said longitudinal axis of said container support frame and said lower crossbeam members extending generally perpendicular to said lower long sill members, one of said lower crossbeam members mounted on said lower long sill members adjacent said forward end of said container support frame and the other of said lower crossbeam members mounted on said lower long sill members adjacent said rearward end of said container support frame whereby said lower long sill members are secured in spaced apart relation; and
- said lower crossbeam member adjacent said rearward end of said container support frame further including a rear hinge angle consisting of a transversely extended section of angle steel generally L-shaped in cross-section, said rear hinge angle having an upright flange and a base flange, said base flange extending generally rearwards on said container support frame.

7. The detachable stabilized intermodal container dumping apparatus of claim 6 wherein said upper and lower frame sections are hingedly connected to one another by a hinge mechanism.

8. The detachable stabilized intermodal container dumping apparatus of claim 7 wherein said hinge mechanism includes at least one lower hinge bracket mounted on said rear hinge angle on said lower frame section and at least one upper hinge bracket mounted on said upper frame section adjacent said rearward end of said container support frame, said at least one lower hinge bracket having at least one hinge pin receiving lower cylinder mounted thereon, said at least one upper hinge bracket having at least one hinge pin receiving upper cylinder mounted thereon, and a cylindrical hinge pin, said upper and lower cylinders mounted such that upon being aligned, said cylindrical hinge pin is insertable into said upper and lower cylinders thereby pivotally securing the upper and lower cylinders to one another and enabling hinged connection of said upper and lower frame sections.

9. A detachable stabilized intermodal container dumping apparatus for removable mounting on an intermodal container transport vehicle, said apparatus comprising;
- a container support frame including longitudinal and transverse frame axes, forward and rearward ends, a lower frame section and an upper frame section,
- four upper frame container connection devices mounted on said upper frame section for removably mounting an intermodal container thereon;
- said upper frame section including frame means operative to fixedly mount said upper frame container connection devices in spaced apart relation whereby said upper frame container connection devices are positioned to receive an intermodal container thereon;
- at least two lower frame connection devices mounted on said lower frame section for removably mounting said container support frame on an intermodal container transport vehicle;
- said lower frame section including frame means operative to fixedly mount said lower frame connection devices in spaced apart relation whereby said lower frame connection devices are positioned to fit onto an intermodal container transport vehicle;
- said upper frame section hingedly connected to said lower frame section adjacent said rearward end of said container support frame along a hinge pivot axis extending generally perpendicular to said longitudinal axis of said container support frame whereby said upper frame section may pivot relative to said lower frame section;
- a hoist unit mounted on said container support frame forward of said hinge pivot axis, said hoist unit including a non-lifting stabilizing frame and at least one lifting device, said lifting device being pivotally attached at both upper and lower ends thereof to said non-lifting stabilizing frame, said stabilizing frame of said hoist unit connected to said lower and upper frame sections forward of said hinge pivot axis such that upon engagement of said lifting device, said upper frame section is pivoted about said hinge pivot axis relative to said lower frame section;
- wherein said frame means of said upper frame section comprises at least two upper long sill members and at least two upper crossbeam members each having outer ends, said upper crossbeam members mounted on said upper long sill members, said upper long sill members extending generally parallel with said longitudinal axis of said container support frame and said upper crossbeam members extending generally perpendicular to said upper long sill members, one of said upper crossbeam members mounted on said upper long sill members adjacent said forward end of said container support frame and the other of said upper crossbeam members mounted on said upper long sill members adjacent said rearward end of said container support frame whereby said upper long sill members are secured in spaced apart relation; one of said upper frame container connection devices being mounted adjacent each of said outer ends of said crossbeam members, said upper frame container connection devices thereby being arranged to accept and secure an intermodal container thereon; and said lower frame connection devices each comprising a rectangular hollow box having walls, a plurality of said walls each including at least one opening extending therethrough for accepting a twistlock connector therein for removably mounting said container support frame on an intermodal container transport vehicle.

* * * * *